(12) United States Patent
Yoneda et al.

(10) Patent No.: US 10,331,007 B2
(45) Date of Patent: Jun. 25, 2019

(54) FUNCTIONAL OPTICAL DEVICE THAT INTEGRATES OPTICAL WAVEGUIDE WITH LIGHT-RECEIVING ELEMENT ON SEMICONDUCTOR SUBSTRATE

(71) Applicant: SUMITOMO ELECTRIC DEVICE INNOVATIONS, INC., Yokohama-shi (JP)

(72) Inventors: Yoshihiro Yoneda, Yokohama (JP); Takuya Okimoto, Yokohama (JP)

(73) Assignee: SUMITOMO ELECTRIC DEVICE INNOVATIONS, INC., Yokohama-shi (JP)

( * ) Notice: Subject to any disclaimer, the term of this patent is extended or adjusted under 35 U.S.C. 154(b) by 0 days.

(21) Appl. No.: 15/909,263

(22) Filed: Mar. 1, 2018

(65) Prior Publication Data
US 2018/0252865 A1 Sep. 6, 2018

(30) Foreign Application Priority Data
Mar. 3, 2017 (JP) .................. 2017-040623

(51) Int. Cl.
*G02F 1/225* (2006.01)
*G02F 1/035* (2006.01)
(Continued)

(52) U.S. Cl.
CPC ....... *G02F 1/2257* (2013.01); *G02B 6/12004* (2013.01); *G02F 1/0353* (2013.01); *G02F 1/21* (2013.01); *G02B 6/14* (2013.01); *G02B 6/2813* (2013.01); *G02B 2006/1215* (2013.01); *G02B 2006/12078* (2013.01); *G02B 2006/12097* (2013.01); *G02B 2006/12123* (2013.01);
(Continued)

(58) Field of Classification Search
CPC ...... G02F 1/21; G02F 1/2257; G02F 2201/07; G02F 2202/06
See application file for complete search history.

(56) References Cited

U.S. PATENT DOCUMENTS 4,111,521 A * 9/1978 Streifer .............. G02B 6/12004
372/50.1
5,727,096 A * 3/1998 Ghirardi ............ G02B 6/12004
385/14
(Continued)

FOREIGN PATENT DOCUMENTS

JP 2003174186 A * 6/2003 ............ H01L 31/10
JP 2013-110207 A 6/2013

*Primary Examiner* — Daniel Petkovsek
(74) *Attorney, Agent, or Firm* — Baker Botts L.L.P.; Michael A. Sartori

(57) ABSTRACT

A functional optical device is disclosed. The functional optical device integrates a coupling unit, a waveguide photodiode (PD) and an optical waveguide on a semiconductor substrate. The coupling unit extracts an optical signal by performing interference of signal light with local light. The optical waveguide carries the optical signal from the coupling unit to the waveguide PD. The semiconductor substrate provides a heavily doped conducting layer and a buffer layer that is un-doped or lightly doped with n-type impurities by density smaller than density of impurities in the heavily doped conducting layer. The conducting layer and the buffer layer continuously and evenly extend from the optical waveguide to the waveguide PD.

4 Claims, 4 Drawing Sheets

(51) Int. Cl.
*G02F 1/21* (2006.01)
*G02B 6/12* (2006.01)
*G02B 6/14* (2006.01)
*G02B 6/28* (2006.01)

(52) U.S. Cl.
CPC .............. *G02B 2006/12152* (2013.01); *G02F 2201/07* (2013.01); *G02F 2202/06* (2013.01)

(56) References Cited

U.S. PATENT DOCUMENTS

| | | | | |
|---|---|---|---|---|
| 7,072,557 B2 * | 7/2006 | Nagarajan | ......... | G02B 6/12004 385/131 |
| 7,310,469 B2 * | 12/2007 | Park | ................... | G02B 6/12004 257/E31.019 |
| 8,106,379 B2 * | 1/2012 | Bowers | ................. | B82Y 20/00 257/14 |
| 9,229,179 B2 * | 1/2016 | Ishibashi | ............... | G02B 6/4214 |
| 9,366,835 B2 * | 6/2016 | Masuyama | .......... | G02B 6/4274 |
| 9,690,122 B2 * | 6/2017 | Kamei | ................. | G02F 1/2257 |
| 9,696,496 B2 * | 7/2017 | Masuyama | ........ | G02B 6/12004 |
| 9,893,100 B2 * | 2/2018 | Yoneda | ............... | H01L 27/1446 |
| 2018/0138350 A1 * | 5/2018 | Nada | ........................ | G02B 6/12 |

* cited by examiner

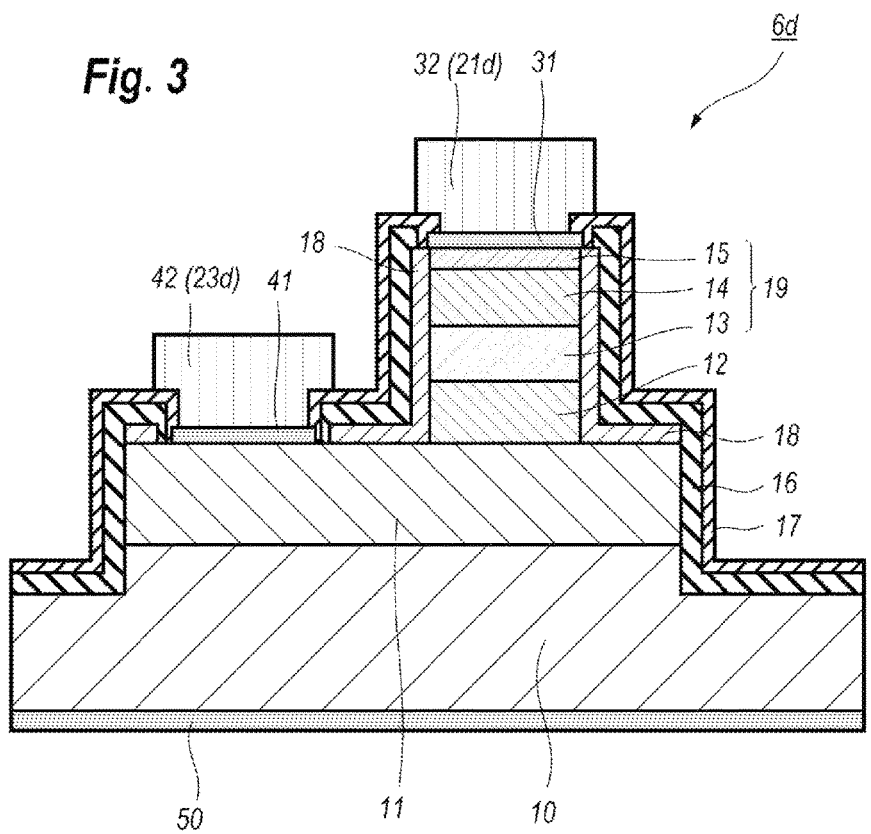

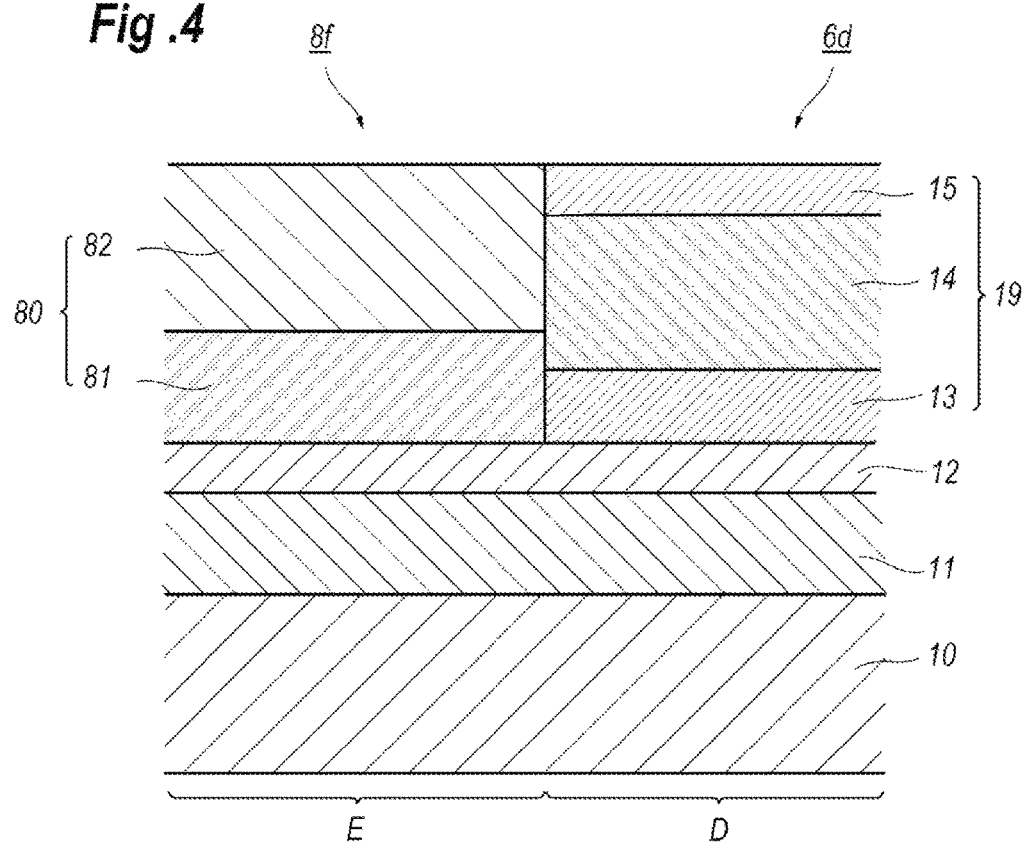

FUNCTIONAL OPTICAL DEVICE THAT INTEGRATES OPTICAL WAVEGUIDE WITH LIGHT-RECEIVING ELEMENT ON SEMICONDUCTOR SUBSTRATE

CROSS REFERENCE TO RELATED APPLICATION

The present application is based on and claims the benefit of priority of Japanese Patent Application No. 2017-040623, filed on Mar. 3, 2017, the entire content of which is incorporated herein by reference.

BACKGROUND

1. Field of Invention

The present invention relates to a functional optical device that monolithically integrates an optical waveguide with a light-receiving device on a semiconductor substrate.

2. Background Art

A Japanese Patent laid open No. JP-2013-110207A has disclosed a functional optical device that monolithically integrates an optical waveguide with a light-receiving element on a semiconductor substrate common to the optical waveguide and the light-receiving element. Such a functional optical device is applicable to a coherent optical communication system. Recent optical communication system, reflecting a continuous request to increase volume to be transmitted, has enhanced the speed thereof, for instance, exceeding 40 Gbps and sometimes reaching 400 Gbps, and adopted complicated algorithm to multiplex signals. An optical receiver, accordingly, is inevitable to give solutions for such a request.

One type of optical receiver called as a waveguide photodiode (PD) is adequate for the functional optical device that monolithically integrates the light-receiving element with the optical waveguide, where the waveguide PD receives photons from the optical waveguide along an absorption layer. In order to enhance response, in particular, high frequency response of the waveguide PD, the absorption layer is necessary to be thinned to shorten a transit time of minority carriers. However, a thinned absorption layer also increases parasitic capacitance between electrodes sandwiching the absorption layer, which brings disadvantages in the high frequency response.

SUMMARY

An aspect of the present invention relates to a functional optical device that extracts information contained in signal light by performing interference of the signal light with local light. The functional optical device integrates a waveguide photodiode (PD) with an optical waveguide monolithically on a semiconductor substrate. The optical waveguide provides a core layer and a cladding layer. The waveguide PD provides an absorption layer and a p-type cladding layer. The substrate provides an n-type conducting layer and a buffer layer each uniformly extending in a region for the optical waveguide and another region for the waveguide PD. The absorption layer in the waveguide PD is sandwiched between the p-type cladding layer and n-type layers including the n-type conducting layer and the buffer layer, which forms an optical confinement structure. The core layer in the optical waveguide is sandwiched by the cladding layer and the n-type layers including the n-type conducting layer and the buffer layer, which also forms an optical confinement structure. A feature of the functional optical device of the present invention is that the buffer layer is un-doped, or lightly doped with n-type impurities by density smaller than density of n-type impurities in the n-type conducting layer.

DESCRIPTION OF DRAWINGS

The foregoing and other purposes, aspects and advantages will be better understood from the following detailed description of a preferred embodiment of the invention with reference to the drawings, in which:

FIG. 3 magnifies the functional optical device in a light-receiving element thereof, and FIG. 4 magnifies the functional optical device in a portion where the optical waveguide optically couples with the light-receiving element by a butt-joint therebetween.

DESCRIPTION OF EMBODIMENT

Next, embodiment according to the present invention will be described as referring to accompanying drawings. However, the present invention is not restricted to the embodiment, and has a scope defined in the claims below and equivalent thereto. In the description of the drawings, numerals or symbols same with or similar to each other will refer to elements same with or similar to each other without duplicating explanations. Also, in the description below, a technical term of "un-doped" means that a semiconductor material doped with impurities by density smaller than $1.0 \times 10^{15}$ cm$^{-3}$.

Figure 1:
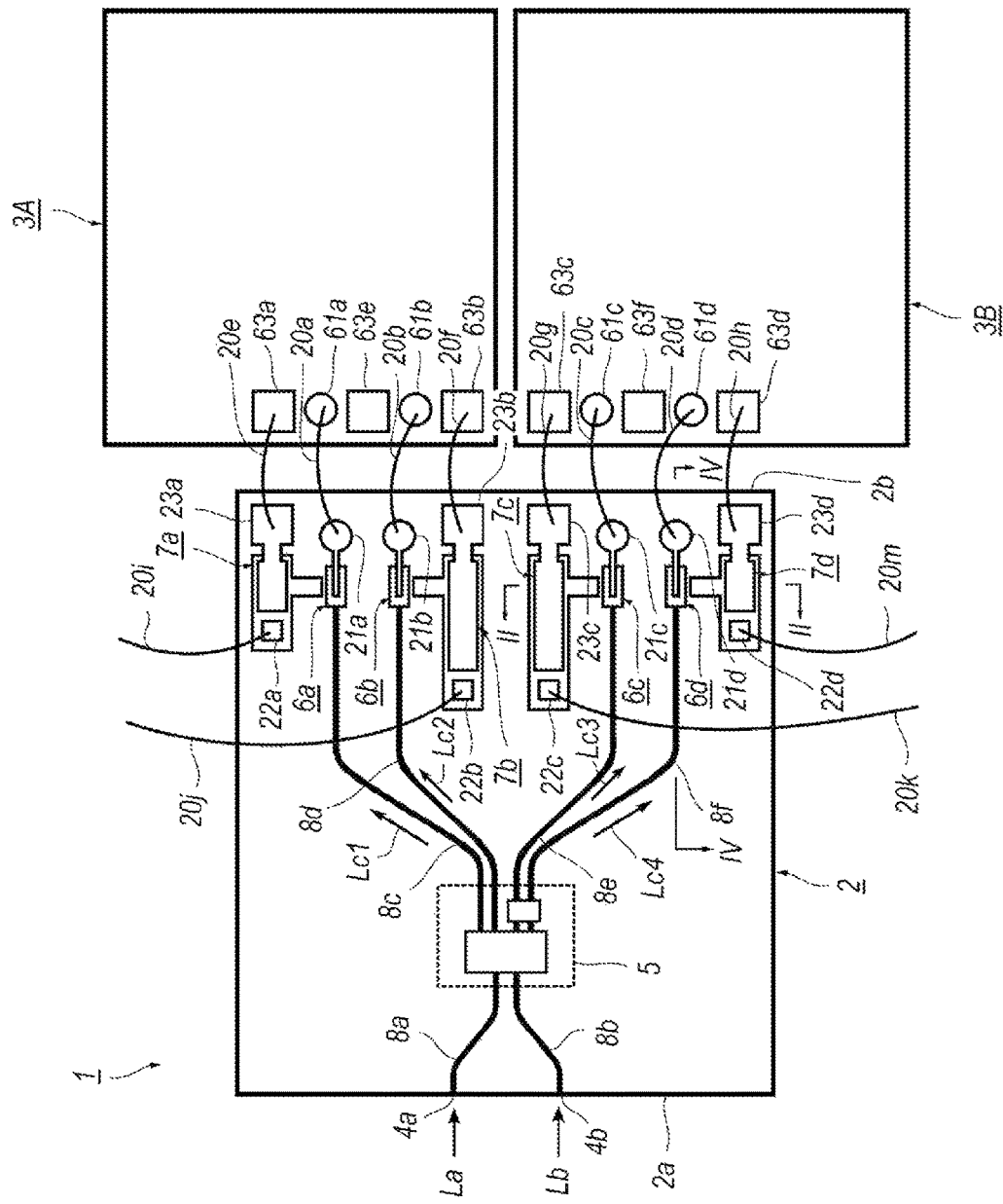
FIG. 1 is a plan view showing an optical receiving apparatus implementing a functional optical device according to an embodiment of the present invention.
Figure 2:
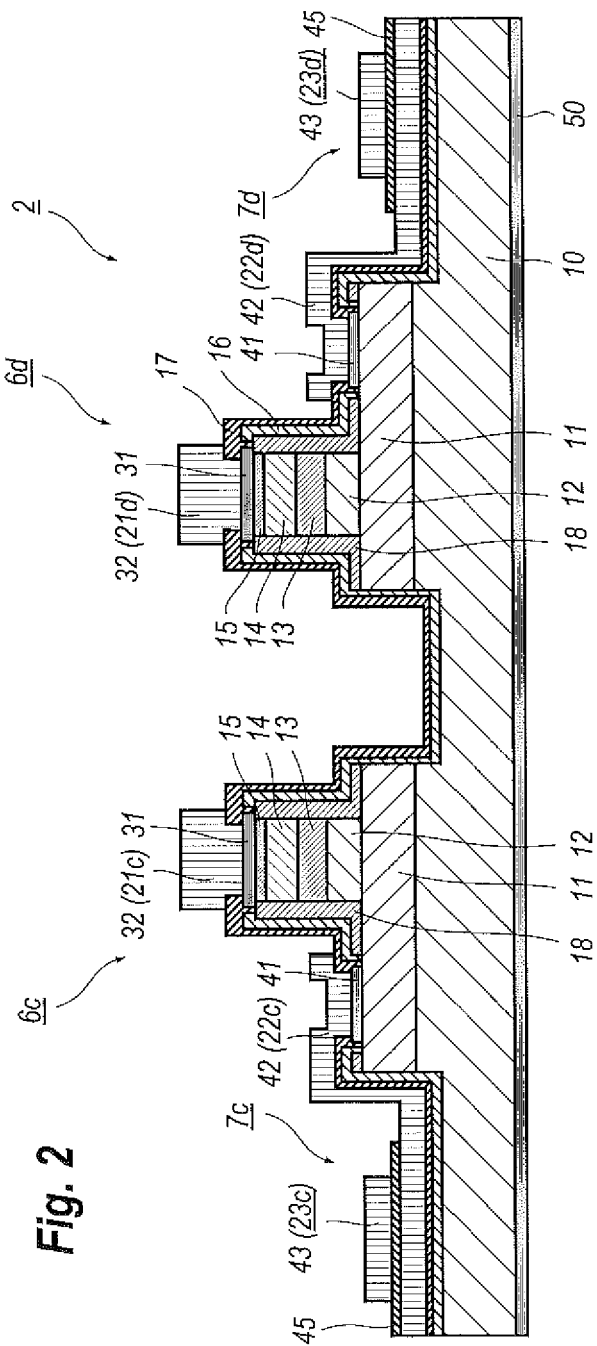
FIG. 2 shows a cross section of the functional optical device shown in FIG. 1 taken along the ling II-II indicated in FIG. 1.

Embodiment according to the present invention relates to an optical apparatus, which may be implemented in a front end of a coherent optical communication system, provides an optically functional device, which integrates an optical hybrid as a coupling unit monolithically with a light-receiving element on a semiconductor substrate, and an amplifier that processes signals generated by the optically functional device. FIG. 1 is a plan view of the optical apparatus 1 including the functional optical device 2 and trans-impedance amplifiers, 3A and 3B; FIG. 2 shows a cross section of the functional optical device 2 that is taken along the line II-II; FIG. 3 is a magnified cross section of the light-receiving device in the functional optical device 2; and FIG. 4 also magnifies a portion where an optical waveguide is butt-jointed with the light-receiving element, which is taken along the ling IV-IV also indicated in FIG. 1.

The optical apparatus 1 of the present embodiment provides a functional optical device 2 and amplifiers, 3A and 3B. The optical functional device 2, which has a rectangular plane shape, is made of indium phosphide (InP) and provides optical waveguides, 8a to 8f, on a top surface thereof. The functional optical device 2 includes two optical ports, 4a and 4b in one edge 2a thereof, and a coupling unit 5 coupled with the optical ports, 4a and 4b, through optical waveguides, 8a and 8b. The functional optical device 2 also provides light-receiving elements, 6a to 6d, and capacitor elements, 7a to 7d, along another edge 2b. Thus, the functional optical device 2 monolithically integrates the coupling unit 5, the optical waveguides, 8a to 8f, the light-receiving elements, 6a to 6d, and the capacitor elements, 7a to 7d, on the semiconductor substrate 10.

One of the edges 2a that provides the optical ports, 4a and 4b, is sometimes called as a front edge, while, another edge 2b opposite to the front edge 2a is called as the rear edge. However, these notation of "front" and "rear" are merely for explanation sake, and do not affect the scope of the present invention. One of the optical ports 4a receives an optical input signal La that multiplexes four signals by the algorithm of, what is called, the quadrature phase shift keying (QPSK), while the other optical port 4b receives an optical local signal Lb having a wavelength substantially identical with that of the of optical input signal La. These two optical ports, 4a and 4b, are coupled with the coupling unit 5 through the optical waveguides, 8a and 8b, each providing a core layer made of InGaAsP and a cladding layer made of InP, where the core layer has refractive index relatively greater than that of the cladding layer to form an optical confinement structure.

The coupling unit 5 may show a function of an optical hybrid. That is, the coupling unit 5 includes a multi-mode interference (MMI) coupler that carries out optically interference of the optical input signal La with the optical local signal Lb to extract four signals, Lc1 to Lc4, where the former two signals, Lc1 and Lc2, have phases complementary to each other and latter two signals, Lc3 and Lc4, also have phases complementary to each other but different by $\pi/2$ against the former two signals, Lc1 and Lc2. That is, the signals, Lc1 to Lc4, have phases of 0, $\pi$, $\pi/2$, and $3\pi/2$, respectively. Accordingly, the framer two signals are called as "in-phase", while, the latter two signals are called as "quadrature phase."

The light-receiving elements, 6a to 6d, which are disposed along the rear edge 2b of the functional optical device 2, have a type of PIN photodiode with a waveguide structure; which is called as the waveguide photodiode (PD). The light-receiving elements, 6a to 6d, which are optically coupled with four outputs of the coupling unit 5 through the waveguides, 8c to 8f, generate photocurrents depending on the signals, Lc1 to Lc4, in magnitudes thereof supplied with bases in cathodes thereof. The functional optical device 2 provides signal pads, 21a to 21d, which are arranged along the rear edge 2b of the optically functional device, are connected with anodes of the respective light-receiving elements, 6a to 6d. The signal pads, 21a to 21d, are also wire-bonded with signal pads, 61a to 61d, provided on the trans-impedance amplifiers, 3A and 3B, through bonding wires, 20a to 20d.

The capacitor elements, 7a to 7d, each include a lower metal, an upper metal, and a dielectric film 45 sandwiched between the lower and upper metals, an arrangement of which is often called as a metal-insulator-metal (MIM) capacitor. The lower and upper metals may be made of stacked metals of titanium tungsten (TiW) and gold (Au), namely, TiW/Au; or stacked metals of titanium, platinum, and gold (Ti/Pt/Au). The capacitor elements, 7a to 7d, are arranged along the rear edge 2b and in side-by-side with respect to the light-receiving elements, 6a to 6d, such that the cathodes of the light-receiving elements, 6a to 6d, are connected with or extracted by interconnections 42 and this interconnections 42 are used as the lower metals of the capacitor elements, 7a to 7d. While, the upper metals 43 of the capacitor elements, 7a to 7d, are extracted to, or converted into pads, 23a to 23d, arranged along the rear edge 2b, and the pads, 23a to 23d, are wire-bonded with ground pads, 63a to 63d, provided on the trans-impedance amplifiers, 3A and 3B. Accordingly, the pads, 23a to 23d, are called as the ground pad, and maybe connected with a back metal 50 provided in the back surface of the substrate 10 through substrate vias formed so as to connect the back surface of the substrate 10 to the ground pads, 23a to 23d, which are not illustrated in the figures. The lower metals 42 of the capacitor elements, 7a to 7d, are extended toward an inside of the substrate 10, and provided with pads, 22a to 22d, to which the biases are supplied from an outside through bonding wires, 20i to 20m. Accordingly, the pads, 22a to 22d, are often called as the bias pad.

The arrangement thus described may monolithically integrate the capacitor elements, 7a to 7d, in the substrate 10, and dispose the capacitor elements, 7a to 7d, in vicinity of the light-receiving elements, 6a to 6d. Besides, the capacitor elements, 7a to 7d, may be grounded in one of electrodes thereof to the back metal 50 through the substrate vias and also to the ground in the trans-impedance amplifiers, 3A and 3B. Accordingly, the ground for the light-receiving elements, 6a to 6d, may enhance the quality thereof.

The trans-impedance amplifiers, 3A and 3B, which are arranged behind the functional optical device 2, may convert the photocurrents generated in the light-receiving elements, 6a to 6d, and transferred through the bonding wires, 20a to 20d, into voltage signals, and externally output thus converted voltage signals by amplifying voltage signals to levels to be output. The trans-impedance amplifiers, 3A and 3B, each provide two signal pads, 61a to 61d, and three ground pads, 63a to 63E As described, the functional optical device 2 may extract two signals each having a differential or complementary configuration; that is, a pair of light-receiving elements, 6a and 6b, may output the in-phase signal; while, the other pair of the light-receiving elements, 6c and 6d, may output the quadrature-phase signal each by the differential or complementary configuration. The trans-impedance amplifier 3A processes the former differential signal by receiving the photocurrents output from the light-receiving elements, 6a and 6b, in the signal pads, 61a and 61b. The other trans-impedance amplifier 3B processes the quadrature-phase signal by receiving the photocurrents of the light-receiving elements, 6c and 6d, in the signals pads, 61c and 61d.

Besides, the trans-impedance amplifiers, 3A and 3B, may further provide additions ground pads, 63e and 63f, between the respective signals pads, 61a and 61b, and 61c and 61d. That is, the signal pads, 61a to 61d, are arranged between the ground pads, 63a to 63E Moreover, the bonding wires, 20a to 20d, for carrying the photocurrents are sandwiched between the bonding wires, 20e to 20h, for securing the ground potential between the trans-impedance amplifiers, 3A and 3B, and the functional optical device 2. Thus, the signals may be carried from the functional optical device 2 to the trans-impedance amplifiers, 3A and 3B, through quasi co-planar configuration, which may suppress degradation of signal quality, in particular, degradation in high frequency components of the signal to be transmitted.

FIG. 2 shows a cross section of the pair of the light-receiving elements, 6c and 6d, while, FIG. 3 concentrates one of the light-receiving element 6d. The other light-receiving elements, 6a to 6c, have the same arrangements with those shown in FIG. 3. FIG. 4 magnifies a portion where an optical waveguide 8f is butt-jointed with the light-receiving element 6d, which is taken along the line IV-IV also indicated in FIG. 1. Also, other portions of the waveguides, 8c to 8e, optically coupled with the light-receiving elements, 6a to 6c, have the same arrangements with those shown in FIG. 4. The light-receiving element 6d and the optical waveguide 8f are monolithically formed on the substrate 10 common to the light-receiving element 6d and the optical waveguide 8f, where the substrate 10 may be made of, for instance, semi-insulating indium phosphide (InP).

As to the light-receiving element 6d, as shown in FIG. 3, the light-receiving element 6d provides an n-type conducting layer 11 provided on the substrate 10, an n-type buffer layer 12, and a structure 19 of the waveguide PD that includes, an absorption layer 13, a p-type cladding layer 14, and a p-type contact layer 15. The n-type conducting layer 11 is the first semiconductor layer, the p-type cladding layer 14 is the second semiconductor layer, and the n-type buffer layer 12 is the third semiconductor layer in the present invention. That is, the first and third semiconductor layers, 11 and 12, and the second semiconductor layer 14 vertically sandwich the absorption layer 13.

The n-type conducting layer 11 may be made of InP doped with silicon (Si) by density of $1 \times 10^{17}$ cm$^{-3}$ and have a thickness of 1 to 2 μm. The n-type buffer layer 12 may be made of un-doped or n-type layer doped with Si by density smaller than $1 \times 10^{16}$ cm$^{-3}$ and have a thickness of 0.1 to 0.3 μm. Density of n-type impurities in the n-type buffer layer 12 is lower than density of n-type impurities, namely Si, in the n-type conducting layer 11. The n-type buffer layer 12 has bandgap energy greater than bandgap energy of the absorption layer 13 but equal to or smaller than bandgap energy of the n-type conducting layer 11. The n-type buffer layer 12 may be made of un-doped InP or Si-doped InP.

The absorption layer 13 may be made of un-doped InGaAs, or n-type InGaAs doped with Si by density smaller than $3 \times 10^{16}$ cm$^{-3}$ and have a thickness of 0.1 to 0.4 μm. The p-type cladding layer may be made of InP doped with zinc (Zn) by density of, for instance, greater than $2 \times 10^{17}$ cm$^{-3}$ and have a thickness of 1 to 2.5 μm. The p-type contact layer 15 may be made of InGaAs doped with Zn by density of $1 \times 10^{18}$ cm$^{-3}$ and have a thickness of 0.1 to 0.3 μm.

The light-receiving device, 6a to 6d, may further provide an intermediate layer between the n-type buffer layer 12 and the absorption layer 13 in order to moderate discrepancy ΔEc in the conduction bands between the n-type buffer layer 12 and the absorption layer 13. The intermediate layer may be un-doped InGaAs or n-type InGaAs doped with Si by density smaller than $1 \times 10^{16}$ cm$^{-3}$. The intermediate layer may be made of InGaAsP having bandgap wavelength, which corresponds to bandgap energy of the fundamental band edge, of 1.4 μm. In another alternative, the light-receiving element, 6a to 6d, may provide a graded layer also between the n-type buffer layer 12 and the absorption layer 13. The graded layer may moderate hetero-gap in the conduction bands between the n-type buffer layer 12 and the absorption layer 13. The graded layer may be comprised of two layers each made of un-doped InGaAsP or Si-doped InGaAsP by density smaller than $1 \times 10^{16}$ cm$^{-3}$, and having bandgap wavelengths of 1.3 μm and 1.1 μm.

Also, the light-receiving element, 6a to 6d, may provide another graded layer between the absorption layer 13 and the p-type cladding layer 14 in order to moderate hetero-gap in the valence bands between the absorption layer 13 and the p-type cladding layer 14. The other graded layer may be comprised of two layers each made of un-doped InGaAsP, or Zn-doped InGaAsP by density smaller than $1 \times 10^{17}$ cm$^{-3}$ and having bandgap wavelengths of 1.3 μm and 1.1 μm.

The light-receiving element, 6a to 6d, in the n-type buffer layer 12, the absorption layer 13, the p-type cladding layer 14, and the p-type contact layer thereof may form a mesa extending along a direction connecting the front edge 2a to the rear edge 2b. The mesa has a pair of sides that are covered with and protected by a burying layer 18 having semi-insulating characteristic. The burying layer may be made of iron (Fe) doped InP. The mesa has a width of 1.5 to 3 μm and a height of 2 to 3.5 μm.

The light-receiving element, 6a to 6d, may further provide insulating films, 16 and 17, on the top of the mesa and the sides of the burying layer 18. The insulating films, 16 and 17, may be made of inorganic material containing silicon (Si) such as silicon oxide ($SiO_2$), silicon nitride (SiN), silicon oxy-nitride (SiON), and so on. The insulating films, 16 and 17, provide an opening in the top of the mesa, through which a p-type electrode 31, which is in contact with the p-type contact layer 15, exposes. The p-type electrode 31 may be made of eutectic metal of gold zinc (Au Zn) or platinum, which are alloyed onto the p-type contact layer 15. Provided on the p-type electrode 31 is the interconnection 32 that is connected with or extends to the signal pad, 21a to 21d. The interconnection 32 may be made of stacked metals of TiW/Au, or Ti/Pt/Au; while, the signal pad, 20a to 20d, are formed by plating gold (Au).

The insulating films, 16 and 17, provide another opening in a side of the mesa of the light-receiving element, 6a to 6d. The other opening exposes the n-type conducting layer 11 with which an n-type electrode 41 is in contact but apart from the n-type buffer layer 12. The n-type electrode 41 may be made of eutectic metal of gold germanium (AuGe), or AuGe containing nickel (AuGeNi) which are alloyed on the n-type conducting layer 11. Provided on the n-type electrode 41 is another interconnection 42 that extends to the capacitor element, 7a to 7d, to form the lower electrode thereof.

An arrangement 80 of the optical waveguides, 8a to 8f, will be described as referring to FIG. 4 that concentrates on the portion where the optical waveguide, 8a to 8f, optically couples with the light-receiving element, 6a to 6d, by, what is called, the butt-joint. The optical waveguide, 8a to 8f, is monolithically formed on the semiconductor substrate 10. The substrate 10 in the optical waveguide, 8a to 8f, includes the n-type conducting layer 11 and also the n-type buffer layer 12, which are continuously extended from those in the light-receiving element, 6a to 6d. That is, the n-type conducting layer 11 and the n-type buffer layer 12 uniformly extend in a region E for the optical waveguide, 8a to 8f, and in a region D for the light-receiving element, 6a to 6d. The arrangement 80 for the optical waveguide, 8a to 8f, may further include a core layer 81 on the n-type buffer layer 12 and a cladding layer 82 on the core layer. The core layer 81 may optically couple with, or form the butt-joint against the absorption layer 13 in the light-receiving element, 6a to 6d.

The n-type conducting layer 11, and the n-type buffer layer 12, may operate as a lower cladding layer with respect to the core layer 81 in the arrangement 80 for the optical waveguide, 8a to 8f, where the n-type conducting layer 11 may operate as the first lower cladding layer, while, the n-type buffer layer 12 may operate as the second lower cladding layer.

The core layer 81 may be made of material having refractive index greater than that of the n-type conducting layer 11 and also the n-type buffer layer 12, and lattice matched with the n-type conducting layer 11 and the n-type buffer layer 12. Thus, the core layer 81 may be made of InGaAsP with the bandgap wavelength of 1.05 μm and have a thickness of 0.3 to 0.5 μm. The cladding layer 82 may be made of material having refractive index smaller than that of the core layer 81 and lattice-matched with the core layer 81. For instance, the cladding layer 82 may be made of InP with a thickness of 1 to 3 jam. The cladding layer 82 has a top surface leveled with the top surface of the p-type contact layer 15 in the light-receiving element, 6a to 6d. Similar to the mesa in the light-receiving element, 6a to 6d, the structure 80 of the optical waveguide, 8a to 8f, in addition to a portion of the n-type conducting layer 11 and the n-type buffer layer 12 form a mesa. The core layer 81 sandwiched by a double layers of the n-type conducting layer 11 and the n-type buffer layer 12 and the cladding layer 82 may form an optically confinement structure by distribution of the refractive indices of the respective layers and a physical structure of the mesa to effectively carry the signal coming from the coupling unit 5 to the light-receiving element, 6a to 6d. The mesa in the top and the sides thereof are covered with and protected by the insulating films, 16 and 17, which is same with the mesa in the light-receiving element, 6a to 6d.

In order to enhance high-frequency response of the light-receiving element, 6a to 6d, the light-receiving element, 6a to 6d, is necessary to reduce parasitic capacitive components thereof. A thicker absorption layer 13 is effective to reduce the parasitic capacitance thereof. However, a thickened absorption layer 13 also results in an elongated carrier transit time in the absorption layer 13. In particular, the transit time of minority carriers, namely holes in the present arrangement, is especially prolonged. Accordingly, the light-receiving element, 6a to 6d, thins the absorption layer 13 but inserts the n-type buffer layer 12 in the side for the n-type conducting layer 11. The n-type buffer layer 12 is fully depleted in a practical operation where an enough negative bias is applied between the n-type conducting layer 11 and the p-type contact layer 15. Because of the thinned absorption layer 13, the minority carrier transmission from the absorption layer 13 to the p-type contact layer 15 may be shortened. But, the n-type buffer layer 12 that is fully depleted in the practical operation does not increase the parasitic capacitance between the electrodes, 31 and 41. Thus, the light-receiving element, 6a to 6d, may enhance the high frequency response.

When the butt-joint is carried out on an un-laminated surface, that is, the region D for the light-receiving element, 6a to 6d, provide the n-type buffer layer 12, while, the region E for the optical waveguide, 8c to 8f, exposes the n-type conducting layer 11, the process for the butt-joint, namely, an epitaxial growth for the core layer 81 and the cladding layer 82 possibly causes an abnormality in the grown layers. Accordingly, the process for forming the butt-joint is necessary to be done on a surface common to that of the light-receiving element, 6a to 6d. That is, the n-type buffer layer 12 is necessary to be extended to the region E for the optical waveguide, 8a to 8f.

When the n-type buffer layer 12 exists under the core layer 81, the core layer 81 may be apart from the impurities doped in the n-type conducting layer 11. That is, because of the highly doped impurities, the n-type conducting layer 11 shows large absorption for free carriers, which may increase optical loss for the light propagating in the core layer 81. The n-type buffer layer 12 that is un-doped or lightly doped with n-type impurities in density smaller than density of the impurities in the n-type conducting layer 11 may reduce the optical loss in the core layer 81.

The n-type buffer layer 12 may be doped with n-type impurities with density smaller than, for instance, $1 \times 10^{16}$ cm$^{-3}$, which is fully depleted in the practical operation where the light-receiving element, 6a to 6d, receives an enough bias between the p-type electrode 31 and the n-type electrode 41. Also, the embodiment thus described provides the n-type buffer layer 12 made of InP that is same with the semiconductor material forming the n-type conducting layer 11. However, the n-type buffer layer 12 may be made of semiconductor material different from that of the n-type conducting layer 11. For instance, the n-type buffer layer 12 may be made of un-doped InGaAsP, or InGaAsP doped with n-type impurities by density smaller than $1 \times 10^{16}$ cm$^{-3}$, where the InGaAsP has a composition by which the bandgap wavelength is shorter than that of the absorption layer 13 but equal to or longer than that of the n-type conducting layer 11.

While particular embodiments of the present invention have been described herein for purposes of illustration, many modifications and changes will become apparent to those skilled in the art. The core layer 81 in the optical waveguide, 8a to 8f, in a material thereof is not restricted to those of InGaAsP system; other systems, for instance, AlGaInAs system may be applicable as the core layer 81. Also, the functional optical device 2 may integrate other devices and elements on the substrate 10. For instance, some electron devices primarily formed by the InP system, for instance, hetero-bipolar transistors (HBTs), resistors, and so on may be also integrated on the substrate 10. In such a case, the functional optical device 2 may show functions realized in the trans-impedance amplifiers, 3A and 3B. Also, when the substrate 10, which is has semi-insulating characteristic in the embodiment, shows n-type conduction, the buffer layer 11 may be removed. In such a case, the substrate may be regarded as the first semiconductor layer of the present invention. Accordingly, the appended claims are intended to encompass all such modifications and changes as fall within the true spirit and scope of this invention.

What is claimed is:

1. A functional optical device that extracts information contained in signal light by interfering between the signal light with local light, the functional optical device comprising:
    a first semiconductor layer having n-type conduction;
    a light-receiving element provided on the first semiconductor layer, the light-receiving element providing an absorption layer and a second semiconductor layer having p-type conduction the absorption layer being provided between the first semiconductor layer and the second semiconductor layer;
    an optical waveguide provided on the first semiconductor layer, the optical waveguide including a core layer and a cladding layer, the core layer optically coupling with the absorption layer in the light-receiving element; and
    a third semiconductor layer on the first semiconductor layer,
    wherein both of the absorption layer in the light-receiving element and the core layer in the optical waveguide are provided on the third semiconductor layer, and
    wherein the third semiconductor layer is doped with impurities by density smaller than density of impurities doped in the first semiconductor layer.

2. The functional optical device according to claim 1, wherein the third semiconductor layer continuously extends from the light-receiving element to the optical waveguide.

3. The functional optical device according to claim 1, wherein the third semiconductor layer has the density of the smaller than $1 \times 10^{16}$ cm$^{-3}$.

4. The functional optical device according to claim 1, wherein the third semiconductor layer has bandgap energy greater than bandgap energy of the absorption layer but equal to or smaller than bandgap energy of the first semiconductor layer.

* * * * *